United States Patent [19]

Duchene

[11] 4,333,710
[45] Jun. 8, 1982

[54] ELECTRODE SYSTEM FOR ELECTROLYTIC DISPLAY MEANS WITH SEVEN SEGMENTS

[75] Inventor: Jacques Duchene, Saint Ismier, France

[73] Assignee: Commissariat a l'Energie Atomique, Paris, France

[21] Appl. No.: 161,921

[22] Filed: Jun. 23, 1980

[30] Foreign Application Priority Data

Jun. 28, 1979 [FR] France ............... 79 16740

[51] Int. Cl.³ .................................. G02F 1/17
[52] U.S. Cl. ......................... 350/357; 29/570
[58] Field of Search ........................... 350/357

[56] References Cited

U.S. PATENT DOCUMENTS

| | | | |
|---|---|---|---|
| 4,123,841 | 11/1978 | Yano et al. | 350/357 |
| 4,128,316 | 12/1978 | Zanoni | 350/357 |
| 4,153,344 | 5/1979 | Hamada et al. | 350/357 |
| 4,280,754 | 7/1981 | Yano et al. | 350/357 |

Primary Examiner—William L. Sikes
Assistant Examiner—Leon Scott, Jr.
Attorney, Agent, or Firm—Kerkam, Stowell, Kondracki & Clarke

[57] ABSTRACT

System of electrodes for electrolytic display means with seven segments, comprising on one wall seven electrodes constituted by a first thin transparent conductive film in the form of a segment having two large sides, said electrodes being subdivided into six peripheral electrodes and one central electrode, each electrode being connected to a second thin conductive film deposited on said wall and forming a current lead, each current lead being connected to a connector, wherein each lead comprises a constricted zone followed by an enlarged zone leading to one of the large sides of one of the electrodes, the constriction relative to the current lead associated with the central electrode being positioned between two adjacent peripheral electrodes.

3 Claims, 3 Drawing Figures

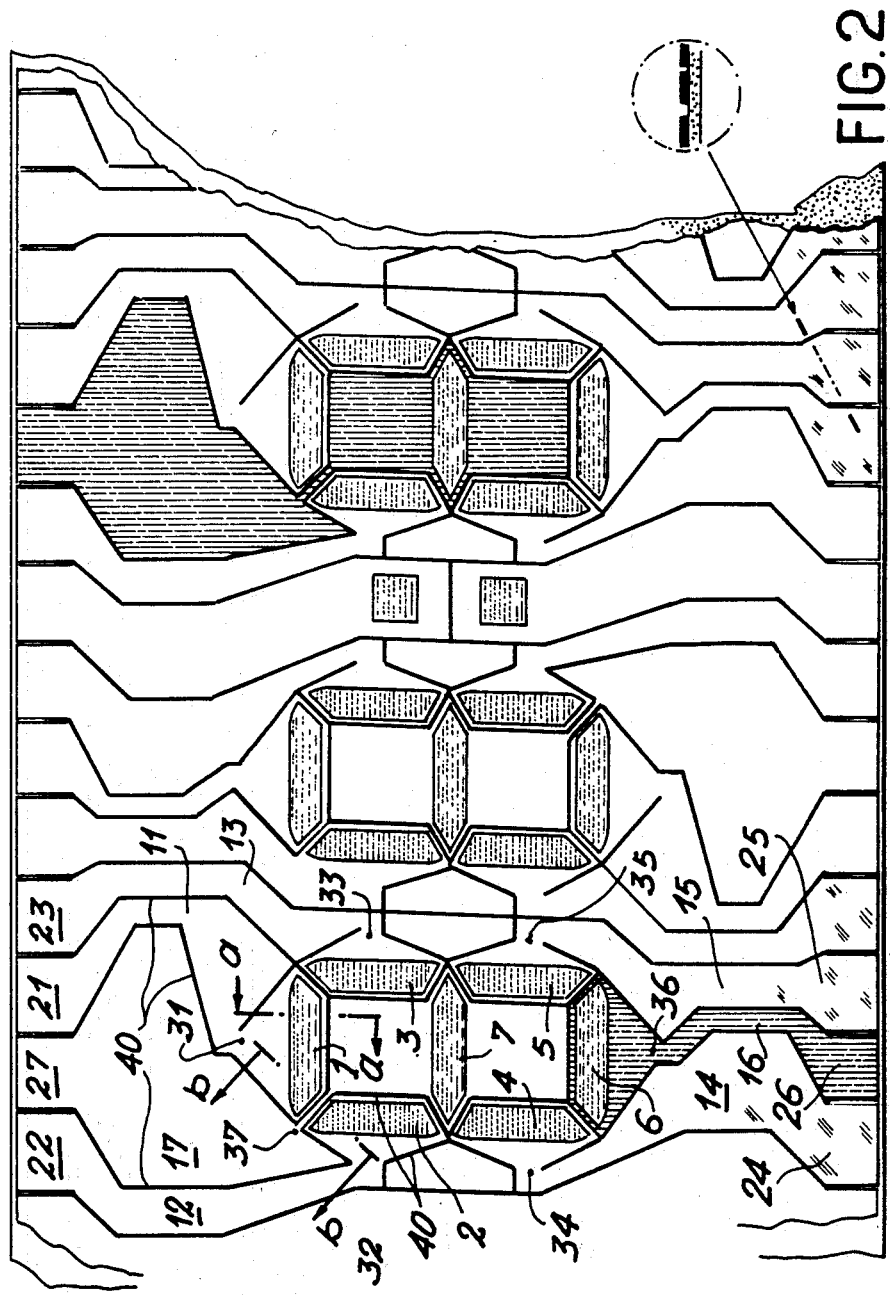

ELECTRODE SYSTEM FOR ELECTROLYTIC DISPLAY MEANS WITH SEVEN SEGMENTS

BACKGROUND OF THE INVENTION

The present invention relates to a system of control electrodes for an electrolytic display means with seven segments. It is used in the construction of display or indication members (watches, instrument panels, measuring apparatus, etc.).

An electrolytic display cell with seven segments comprises a counter-electrode, facing which there are seven transparent electrodes in the form of six peripheral electrodes and one central electrode. Each electrode is supplied with current by a current lead, itself connected to a connector permitting a connection with appropriate supply means. An electrolyte is placed between the electrodes and the counter-electrode and is able to modify the appearance of the electrodes, particularly by the deposition and then dissolving of a metal coating under the effect of the passage of current.

The control of electrolytic cells causes specific problems not encountered with other types of cells, e.g. with liquid crystals or electrochromic material. Thus, in the case of electrolytic display it is essential that there is a good uniformity of the potential applied to the excited electrodes, if not the display contrast obtained does not have the necessary uniformity. This is due to the electrochemical nature of the reaction occurring on the electrodes. This problem does not occur in the case of liquid crystal cells where the current is approximately 1,000 times lower than in electrolytic cells (a few $\mu A/cm^2$ instead of a few $mA/cm^2$). In addition, said current is a stray current and not a controlled current. It also does not exist in the case of electrochromic devices (e.g. using $WO_3$) for which the appearance or disappearance of colouring is less critical.

This is the reason why the known electrode systems for liquid crystal or electrochromic layer cells are unsatisfactory when used for electrolytic cells.

The problem of contrast uniformity in electrolytic cells is made more difficult by the fact that the current leads and electrodes are formed from thin conductive oxide coatings which, due to their thinness, have a by no means negligible resistivity.

This problem involves three specific difficulties:
(a) obtaining an equal voltage drop along the current leads between the connector and the electrodes;
(b) ensuring a potential uniformity over the entire surface of each electrode;
(c) solving the two above points for all the segments, including the central segment, whose access is difficult because it is surrounded by the six peripheral segments.

On using an apparatus of the type described, for example, in German Patent Application 2,731,718 entitled "Elektrochromes Anzeige-element", the central segment will be the seat of a potential gradient, because it is supplied by one of its small sides. Although this problem is not serious for an electrochromic material cell it is prohibitive with an electrolytic cell. On using an apparatus of the type described, for example, in U.S. Pat. No. 3,702,723 entitled "Segmented Master Character for Electronic Display Apparatus", the voltage drop is not the same over all the current leads between the connector and the electrodes and the segments will not all have the same appearance.

BRIEF SUMMARY OF THE INVENTION

The present invention aims at obviating these disadvantages by proposing a system making it possible to simultaneously solve the three difficulties referred to hereinbefore. This is achieved by supplying the seven electrodes in the same way. The presence of a central electrode makes it necessary for the current supply for the said electrode to pass between two peripheral electrodes, leading to a construction for the current supply. According to the invention this construction is reproduced on the current supplies for the six peripheral electrodes, which is obviously not obtained in the prior art where the ease of access of the peripheral electrodes is utilized for supplying them with simply shaped current leads. Furthermore to prevent the voltage drop along the segment each electrode is supplied along the whole of one of its large sides. This necessitates a widened or enlarged zone between the constriction and the segment for each current lead. In this way the current lines diverge (or converge, as a function of the current direction) between the construction and the large side of the electrode, the latter substantially co-inciding with an equipotential line of the current supply. Naturally every effort is made to give the dimensions (width and length) of the current leads between a connector and the associated constriction values such that the voltage drops are the same for all the current leads.

More specifically the present invention relates to a system of electrodes for electrolytic display means with seven segments, comprising on one wall seven electrodes constituted by a first thin transparent conductive film in the form of a segment having two large sides, said electrodes being subdivided into six peripheral electrodes and one central electrode, each electrode being connected to a second thin conductive film deposited on said wall and forming a current lead, each current lead being connected to a connector, wherein each lead comprises a constricted zone followed by an enlarged zone leading to one of the large sides of one of the electrodes, the constriction relative to the current lead associated with the central electrode being positioned between two adjacent peripheral electrodes.

Preferably the first film constituting the electrodes and the second film constituting the current leads comprise a single film of a single transparent conductive material, the current leads being covered with an insulating material.

BRIEF DESCRIPTION OF THE DRAWINGS

The invention is described in greater detail hereinafter relative to non-limitative embodiments and with reference to the attached drawings, wherein show:

FIG. 2 a special embodiment of an electrolytic display means according to the invention.

DETAILED DESCRIPTION OF THE PREFERRED EMBODIMENTS

Figure 1:
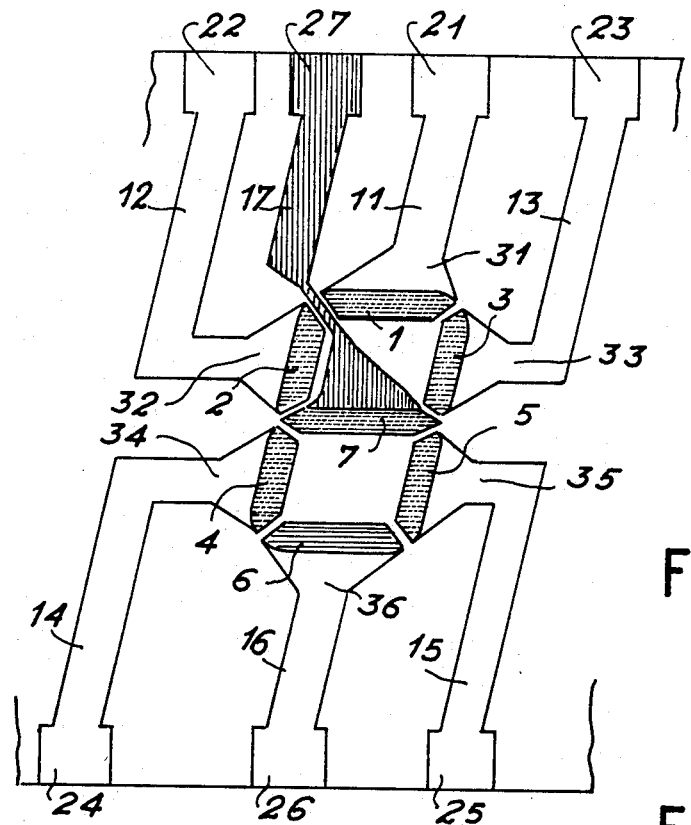
FIG. 1 diagrammatically a system of electrodes according to the invention.

The system shown in FIG. 1 comprises six peripheral electrodes 1, 2, 3, 4, 5, and 6, and a seventh centrally positioned electrode 7. These electrodes are constituted, for example, by a tin-doped indium oxide film or an antimony-doped tin oxide film. It also comprises current leads 11 to 17 connecting the electrodes to connectors 21 to 27. These connectors can be arranged on the sides of the apparatus in the manner shown or can all be arranged on the same side.

According to the invention each current lead comprises a constricted zone 31 to 37, including those of the peripheral electrodes 1 to 6. The constriction of current leads 17 relative to central electrode 7 is, in the present case, positioned between the peripheral electrodes 1 and 2. The current leads then have enlarged zone, which leads to the large side of the electrodes. In this way the electrode is supplied in substantially uniform manner over its entire length. The only possible uniformity defect that then exists results from the voltage drop in the widthwise direction of the electrode and which is negligible. The width and length of the current leads between connectors 21 and 27 and constrictions 31 to 37 are adjusted so that the voltage drop between said connectors and said constrictions are the same for all the current leads 11 to 17. This ensures the uniformity of display over all the electrodes, including the central electrode.

FIG. 1 is a basic circuit. In practice the system can be formed in the way shown in FIGS. 2 and 3, which represent a variant in which the electrodes and current leads are made from the same transparent conductive material deposited in the form of a thin film over the entire wall. Grooves made in this film ensure the insulation between the different leads. FIG. 2 shows a plan view of the system and FIG. 3 two sections, on the one hand in the vicinity of electrode 1 (FIG. a) and on the other in the constriction zone 37 located between electrodes 1 and 2 (FIG. b). As illustrated the system comprises a wall covered by a uniform film 44 of a transparent conductive material (e.g. tin-doped indium oxide) in which are made grooves 40 in order to insulate the current leads from one another and also in order to insulate the connectors and form constrictions. Film 44 is covered with an insulating layer 46 (e.g. of silica), except at the locations of the electrodes which are then in contact with an electrolyte 48. The display is obtained, for example, by deposition and redissolving of a metal coating 50 (in particular silver). The area located between electrodes 1 and 2 (FIG. 3b) the current lead is separated from the electrodes by two grooves 40 and the gap is covered with insulating material.

For information purposes the gap between electrodes 1 and 2 can be approximately 400 to 500 $\mu$m and the groove width can be approximately 50 $\mu$m.

Figure 3:
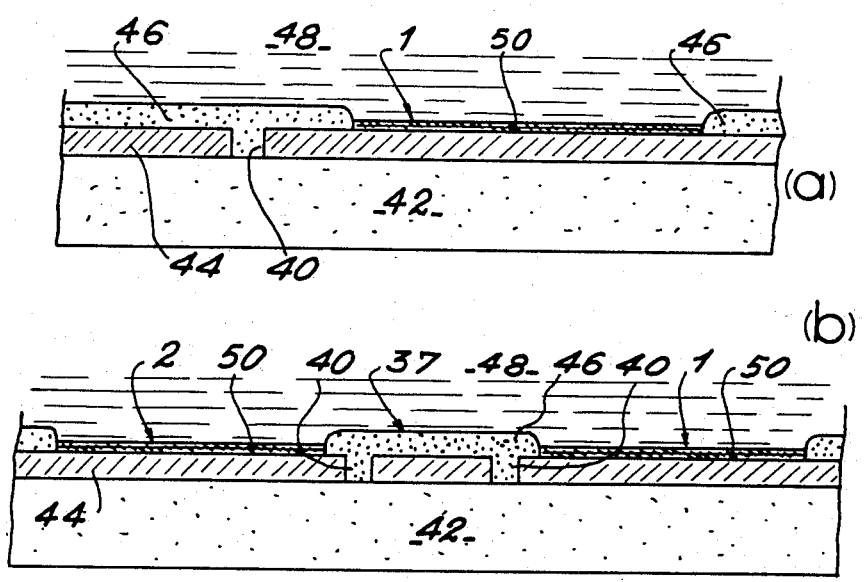
FIG. 3 two sectional views of the display means of FIG. 2.

The embodiment of FIGS. 2 and 3 leads to an excellent uniformity of the appearance of the display means, due to the structural uniformity of the wall facing the observer.

In the embodiment of FIG. 2 it can be seen that the central segment is supplied by a current lead coming from the top of the first system, from the bottom for the second system, and so on in alternating manner. In each system the second electrode is also in contact with a conductive zone symmetrical to the current supply zone, said symmetrical zone not participating in the supply of the segments, being provided only to bring about a uniform appearance of the cell. In the same way there are islands of conductive material which merely serve to fill the visible surface.

What is claimed is:

1. A system of electrodes for electrolytic display means with seven segments, comprising on one wall seven electrodes constituted by a first thin transparent conductive film in the form of a segment having two large sides, said electrodes being subdivided into six peripheral electrodes and one central electrode, each electrode being connected to a second thin conductive film deposited on said wall and forming a current lead, each current lead being connected to a connector, wherein each lead comprises a constricted zone followed by an enlarged zone leading to one of the large sides of one of the electrodes, the constriction relative to the current lead associated with the central electrode being positioned between two adjacent peripheral electrodes.

2. A system of electrodes according to claim 1, wherein the first coating constituting the electrodes and the second coating constituting the current leads are formed by a single coating of a transparent conductive material, the current leads being covered with an insulating material.

3. A system of electrodes according to claim 2, wherein the thin films of transparent conductive material form the different current leads and the electrodes cover the entire wall, the various leads being insulated from one another by grooves made in the said film.

* * * * *